US012750903B2

(12) United States Patent
Liu

(10) Patent No.: US 12,750,903 B2
(45) Date of Patent: Sep. 29, 2026

(54) BLUETOOTH CONNECTION METHOD AND APPARATUS, ELECTRONIC DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventor: Peng Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 261 days.

(21) Appl. No.: 18/755,428

(22) Filed: Jun. 26, 2024

(65) Prior Publication Data

US 2024/0430964 A1 Dec. 26, 2024

Related U.S. Application Data

(63) Continuation of application No. PCT/CN2022/136186, filed on Dec. 2, 2022.

(30) Foreign Application Priority Data

Dec. 29, 2021 (CN) ......................... 202111643910.8

(51) Int. Cl.
*H04W 76/15* (2018.01)

(52) U.S. Cl.
CPC .................................. *H04W 76/15* (2018.02)

(58) Field of Classification Search
CPC ......... H04W 76/15; H04W 4/00; H04W 4/80; Y02D 30/70
See application file for complete search history.

(56) References Cited

U.S. PATENT DOCUMENTS

| | | | | |
|---|---|---|---|---|
| 11,589,409 B2 * | 2/2023 | Watanabe | ............. | G06F 3/1204 |
| 2014/0094198 A1 | 4/2014 | Heo et al. | | |
| 2015/0365892 A1 * | 12/2015 | Ma | .................... | H04W 52/0209 455/574 |

FOREIGN PATENT DOCUMENTS

| | | |
|---|---|---|
| CN | 109921968 A | 6/2019 |
| CN | 112492564 A | 3/2021 |
| CN | 113056033 A | 6/2021 |

OTHER PUBLICATIONS

International Search Report and Written Opinion, International Application No. PCT/CN2022/136186, mailed Feb. 13, 2023 (11 pages).

* cited by examiner

*Primary Examiner* — Fayyaz Alam
(74) *Attorney, Agent, or Firm* — Ladas & Parry LLP

(57) ABSTRACT

The present application relates to a Bluetooth connection method and apparatus, an electronic device, and a computer-readable storage medium. The method is applied to a first device. The first device comprises a first processor, a second processor, and a Bluetooth module; the first processor is communicatively connected to the second processor, and the Bluetooth module is communicatively connected to the first processor; the first processor is configured to run a first operating system, and the second processor is configured to run a second operating system; the running power consumption of the first processor is less than that of the second processor. The method comprises: in response to a first Bluetooth connection instruction, controlling the first operating system to establish a first Bluetooth connection with a second device by means of the Bluetooth module (220); and sending a state of the second operating system to the second device by means of the first Bluetooth connection, so that the second device determines, according to the state of the (Continued)

second operating system, to establish a second Bluetooth connection with the second operating system (240).

20 Claims, 7 Drawing Sheets

BLUETOOTH CONNECTION METHOD AND APPARATUS, ELECTRONIC DEVICE, AND COMPUTER-READABLE STORAGE MEDIUM

CROSS REFERENCE TO RELATED APPLICATIONS

The present application is a continuation application of the international patent application No. PCT/CN2022/136186, filed on Dec. 2, 2022, which claims the priority of the Chinese patent application No. 202111643910.8, filed on Dec. 29, 2021, contents of which are incorporated herein by its entireties.

TECHNICAL FIELD

The present disclosure relates to the technical field of computers, and in particular, to a Bluetooth connection method, a Bluetooth connection apparatus, an electronic device, and a computer-readable storage medium.

BACKGROUND

As functions of electronic devices become more powerful, electronic devices installed with only one operating system may not meet functional demands of users. As a result, some electronic devices are installed with dual operating systems to provide a better user experience. When the electronic device installed with dual operating systems is using Bluetooth services, both operating systems need to establish Bluetooth connection with an external device via respective Bluetooth modules.

However, since both operating systems take the respective Bluetooth modules to establish the Bluetooth connection with the external device, the electronic device may not be able to support the Bluetooth service when there is a malfunction in the operating systems.

SUMMARY OF THE DISCLOSURE

The embodiments of the present disclosure provide a Bluetooth connection method and an apparatus, an electronic device and a computer-readable storage medium, which can enable an operating system currently running on the first device to support Bluetooth services.

In a first aspect, the present disclosure provides a Bluetooth connection method performed by a first device. The first device includes a first processor, a second processor, and a Bluetooth module. The first processor is communicatively connected to the second processor, and the Bluetooth module is communicatively connected to the first processor. The first processor is configured to run a first operating system, and the second processor is configured to run a second operating system. The operating power consumption of the first processor is less than that of the second processor. The method includes:

- in response to the first Bluetooth connection instruction, controlling the first operating system to establish a first Bluetooth connection with a second device via the Bluetooth module;
- sending a state of the second operating system to the second device via the first Bluetooth connection to enable the second device to determine, based on the state of the second operating system, whether to establish a second Bluetooth connection with the second operating system.

In another aspect, the present disclosure provides a Bluetooth connection method performed by a second device. A first device comprises a first processor, a second processor and a Bluetooth module. The first processor is communicatively connected to the second processor, and the Bluetooth module is communicatively connected to the first processor. The first processor is configured to run a first operating system, and the second processor runs a second operating system. The method includes:

- in response to the first Bluetooth connection instruction, establishing the first Bluetooth connection with the first operating system via the Bluetooth module;
- receiving a state of the second operating system sent by the first device via the first Bluetooth connection;
- establishing a second Bluetooth connection with the second operating system based on the state of the second operating system.

In still another aspect, the present disclosure provides a Bluetooth connection apparatus, configured in a first device. The first device includes a first processor, a second processor, and a Bluetooth module. The first processor is communicatively connected to the second processor, and the Bluetooth module is communicatively connected to the first processor. The first processor is configured to run a first operating system, and the second processor is configured to run a second operating system. The apparatus includes:

- a first control module, configured to control, in response to the first Bluetooth connection instruction, the first operating system to establish the first Bluetooth connection with the second device via the Bluetooth module;
- a sending module, configured to send a state of the second operating system to the second device via the first Bluetooth connection to enable the second device to determine whether to establish a second Bluetooth connection with the second operating system based on the state of the second operating system.

An electronic device includes a memory, a first processor and a second processor. The memory stores computer programs. The computer programs, when being executed by the processor, enables the first processor and the second processor to perform the Bluetooth communication method as described above.

A computer readable storage medium stores computer programs. The computer programs, when being executed by a processor, implement the Bluetooth communication method as described above.

In still another aspect, the present disclosure provides a computer program product which stores computer programs. The computer programs, when being executed by a processor, implement the Bluetooth communication method as described above.

BRIEF DESCRIPTION OF THE DRAWINGS

To illustrate the technical solution more clearly in the embodiments of the present disclosure or in the art, accompanying drawings for the embodiments or the art will be briefly described in the following. Obviously, the drawings in the following description show only some of the embodiments of the present disclosure, and any ordinary skilled person in the art may obtain other drawings based on these drawings without creative work.

DETAILED DESCRIPTION

In order to make the purpose, technical solutions and advantages of the embodiments of the present disclosure clearer, the technical solutions in the embodiments of the present disclosure will be described clearly and completely below by referring to the accompanying drawings in the embodiments of the present disclosure. It is understood that the embodiments described are a part of, not all of, the embodiments of the present disclosure.

Figure 1:
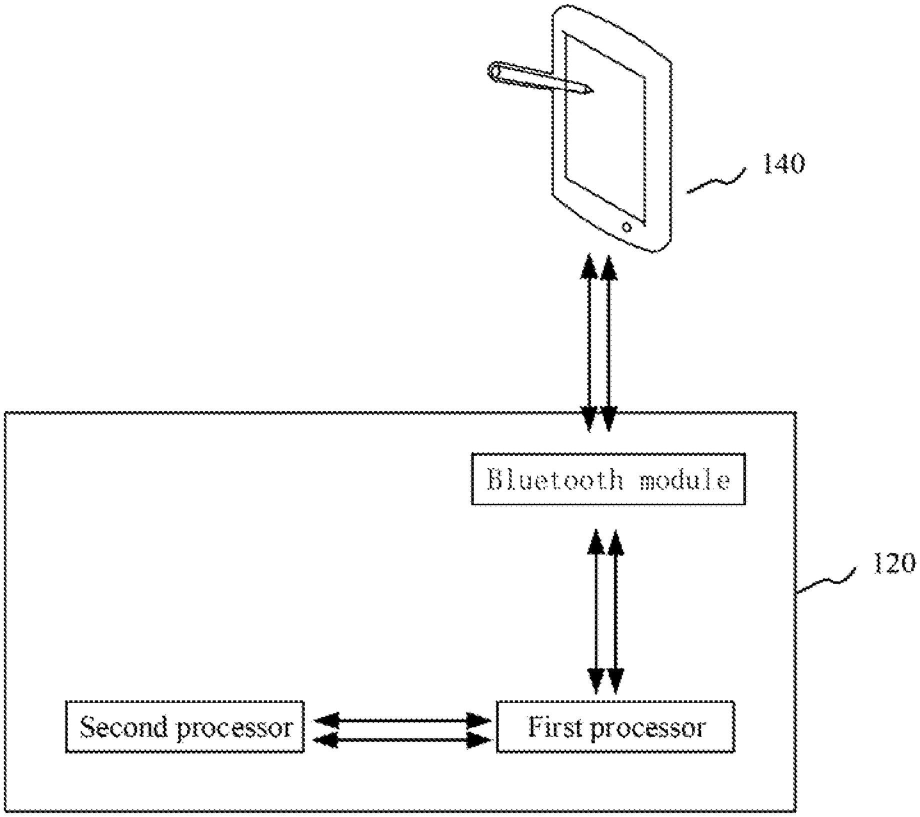
FIG. 1 is an application scenario of a Bluetooth connection method according to an embodiment of the present disclosure.

FIG. 1 is an application scenario of a Bluetooth connection method according to an embodiment of the present disclosure. As shown in FIG. 1, the application scenario includes a first device 120 and a second device 140. The first device 120 includes a first processor, a second processor and a Bluetooth module. The first processor is communicatively connected to the second processor, and the Bluetooth module is communicatively connected to the first processor. The first processor is configured to run a first operating system, and the second processor is configured to run a second operating system. A running power consumption of the first processor is less than that of the second processor. The method includes: in response to a first Bluetooth connection instruction, controlling the first operating system to establish a first Bluetooth connection with the second device via the Bluetooth module; and sending a state of the second operating system to the second device via the first Bluetooth connection, enabling the second device to determine, based on the state of the second operating system, whether to establish a second Bluetooth connection with the second operating system. The first device 120 may be any terminal device such as a mobile phone, a tablet computer, a personal digital assistant (PDA), a wearable device (e.g., a smart watch) or a smart home device.

In the art, an electronic device is installed with one operating system running on a single-core processor. When establishing the Bluetooth connection, the single-core processor in the electronic device is connected to an external device via the Bluetooth module, allowing the only operating system to support Bluetooth services. However, as functions of the electronic device become more powerful, the electronic device installed with only one operating system may not meet functional demands of users. As a result, some electronic devices are installed with dual operating systems to provide a better user experience. For example, the first processor is configured to run the first operating system, and the second processor is configured to run the second operating system. Typically, the electronic device installed with the dual operating systems is configured with only one Bluetooth module. Therefore, both operating systems need to use the same Bluetooth module to establish the Bluetooth connection with the external device when the electronic device installed with the dual operating systems is running the Bluetooth services. Bluetooth services in the dual operating systems are separated and independent from each other. That is, when the Bluetooth services are implemented on the first operating system, the first processor, which runs the first operating system, directly communicates with the Bluetooth module without relying on the second operating system. Similarly, when the Bluetooth services are implemented on the second operating system, the second processor, which runs the second operating system, also directly communicates with the Bluetooth module without relying on the first operating system. The Bluetooth module is configured to achieve a Bluetooth communication function.

In the above case, both operating systems need to use the same Bluetooth module to establish the Bluetooth connection with the external device and the Bluetooth services in one of the two operating systems is completely separate and independent from the Bluetooth services in the other one of the two operating systems. Therefore, under certain circumstances, one of the two operating systems that is currently running on the electronic devices may not be able to support the Bluetooth services. For example, the electronic device is currently running the first operating system, and the external device cannot determine which operating system is currently run by the electronic device. In this case, when the external device is currently connected to the second processor that is running the second operating system, the electronic device cannot use the first operating system to support the Bluetooth services. On the contrary, in another case, the electronic device is currently running the second operating system, and the external device cannot determine which operating system is currently run by the electronic device. When the external device is currently connected to the first processor that is running the first operating system, the electronic device cannot use the second operating system to support the Bluetooth services. In these cases, the external device needs to make trials finding connection errors and switch Bluetooth connections, and subsequently, the operating system running that is currently run by the electronic device is enabled to support the Bluetooth services.

Therefore, embodiments of the present disclosure provide a Bluetooth connection method in which Bluetooth services of different operating systems are not separated from each other. Instead, the electronic device controls, in response to the first Bluetooth connection instruction, the first operating system to establish the first Bluetooth connection with the second device via the Bluetooth module. Subsequently, the electronic device sends the state of the second operating system to the second device via the first Bluetooth connection to enable the external device to determine, based on the state of the second operating system, whether to establish the second Bluetooth connection with the second operating system. The operating system currently that is currently run by the electronic device can be determined based on the state of the second operating system. Furthermore, the external device determines, based on the currently-running operating system, whether to establish the second Bluetooth connection with the second operating system. In this way, the currently-running operating system is enabled to support the Bluetooth services.

Figure 2:
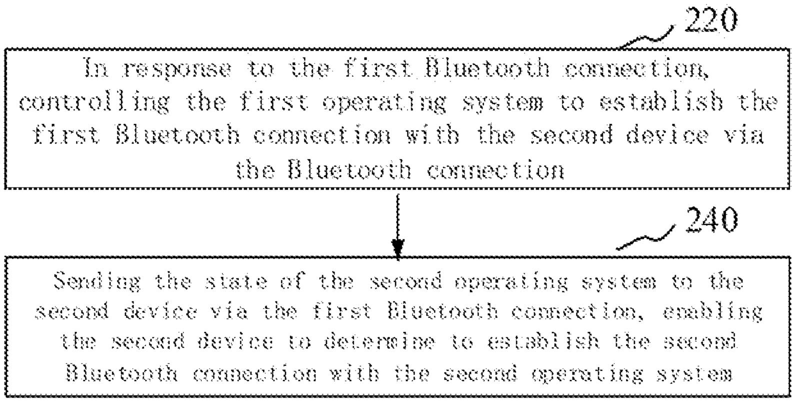
FIG. 2 is a flow chart of a Bluetooth connection method according to an embodiment of the present disclosure.

FIG. 2 is a flow chart of a Bluetooth connection method according to an embodiment of the present disclosure. The Bluetooth connection method in the present embodiment is described as an example being performed by the first device 120 in FIG. 1. The first device 120 includes a first processor, a second processor and a Bluetooth module. The first processor is communicatively connected to the second processor, and the Bluetooth module is communicatively connected to the first processor. The first processor is configured to run a first operating system, and the second processor is configured to run a second operating system. A running power consumption of the first processor is less than that of the second processor. Therefore, the first operating system may be a microcontroller unit system (MCU). As the first processor is configured to run the first operating system, the first processor may be a micro control unit (MCU). The first operating system serves as a basic operating system on the first device. In most application scenarios, the first device runs the first operating system. For example, only the first device is configured to implement services such as health monitoring or motion monitoring. The second operating system may be the Android system or the IOS system. The second processor is configured to run the second operating system, and the second processor may be a system-on-a-chip (SOC). The second operating system serves as an advanced operating system on the first device. In some application scenarios where more functional requirements need to be met, the first device runs the second operating system. For example, the first device implements services such as answering a phone call of the second device. The present disclosure does not limit detailed application scenarios.

The first device may run dual operating systems or a plurality of operating systems. Each operating system runs on a corresponding processor. That is, the first device includes a plurality of processors. The number of processors and operating systems are not limited by the present disclosure.

Specifically, as shown in FIG. 2, the Bluetooth connection method is performed by the first device and includes following blocks.

At block 220, in response to the first Bluetooth connection instruction, the first operating system is controlled to establish the first Bluetooth connection with the second device via the Bluetooth module.

The first device may be the electronic device running the dual operating systems, such as a smartwatch. The first device may run the first operating system alone or run both the first operating system and the second operating system at the same time. That is, the first operating system is running on the first device all the time to achieve some basic services. In addition, an interface and an application of the second operating system running on the first device 120 are different from an interface and an application of the first operating system running on the first device 120.

The second device is the external device that establishes the Bluetooth connection with the first device. The second device may be a device supporting only one operating system or a device supporting dual operating systems, which is not limited by the present disclosure. For example, the second device may be a smartphone, which is not limited by the present disclosure.

When establishing the Bluetooth connection between the first device and the second device, the second device sends the first Bluetooth instruction to the first device. Since the first operating system is running on the electronic device all the time, after receiving the first Bluetooth connection instruction, the first device may, in response to the first Bluetooth connection instruction, control the first operating system to establish the first Bluetooth connection with the second device via the Bluetooth module. The first Bluetooth connection instruction is configured to instruct the first operating system to establish the first Bluetooth connection with the second device via the Bluetooth module.

When establishing the Bluetooth connection between the first device and the second device, it may be the first device that proactively triggers generation of the first Bluetooth connection instruction. Since the first operating system is running on the electronic device all the time, after receiving the first Bluetooth connection instruction, the first device may, in response to the first Bluetooth connection instruction, control the first operating system to establish the first Bluetooth connection with the second device via the Bluetooth module. The first device proactively triggering the generation of the first Bluetooth connection instruction may refer to the first device proactively triggering the generation of the first Bluetooth connection instruction after receiving an operation instruction from the user. The present disclosure does not limit a condition for triggering the first device.

At block 240, the state of the second operating system is sent to the second device via the first Bluetooth connection to enable the second device to determine, based on the state of the second operating system, whether to establish the second Bluetooth connection with the second operating system.

After the first Bluetooth connection is established between the first device and the second device, the first operating system in the first device may take the Bluetooth module to communicate with the second device. Therefore, the first operating system obtains the state of the second operating system in the first device and sends the state of the second operating system in the first device to the second device via the first Bluetooth connection. In this way, the second device obtains the state of the second operating system in the first device in real-time, such that the second device determines, based on the state of the second operating system, whether to establish the second Bluetooth connection with the second operating system. That is, at this moment, when the second operating system in the first device is in a running state or in a sleeping state, it is determined that the second operating system needs to support the Bluetooth services, and therefore, the second device determines to establish the second Bluetooth connection with the second operating system. The Bluetooth connection between the second device and the second operating system may be a communicative connection established based on the first Bluetooth connection or a communicative connection that is completely independent of the first Bluetooth connection, which is not limited by the present disclosure.

When the second operating system in the first device is in a shutdown state, it is determined that the second operating system does not need to support the Bluetooth business, and therefore, the second device determines not to establish the second Bluetooth connection with the second operating system.

In the present embodiments, the first device, in response to the first Bluetooth connection instruction, controls the first operating system to establish the first Bluetooth connection. That is, regardless of whether the first operating system or the second operating system is running in the first device, the first Bluetooth connection is established firstly. The state of the second operating system is then sent to the second device via the first Bluetooth connection, enabling the second device to determine, based on the state of the second operating system, whether to establish the second Bluetooth connection with the second operating system. The first device may send the state of the second operating system to the second device via the first Bluetooth connection between the first operating system and the second device, such that the second device obtains the state of the second operating system. In this way, the second device determines, based on the state of the second operating system, whether the second Bluetooth connection needs to be established, in addition to the first Bluetooth connection, to enable the second operating system to support the Bluetooth services.

In this way, the second device obtains the state of the second operating system in the first device, and determines whether to establish the second Bluetooth connection with the first device to enable the operating system, which is currently run by the first device, to support the Bluetooth services.

Figure 3:
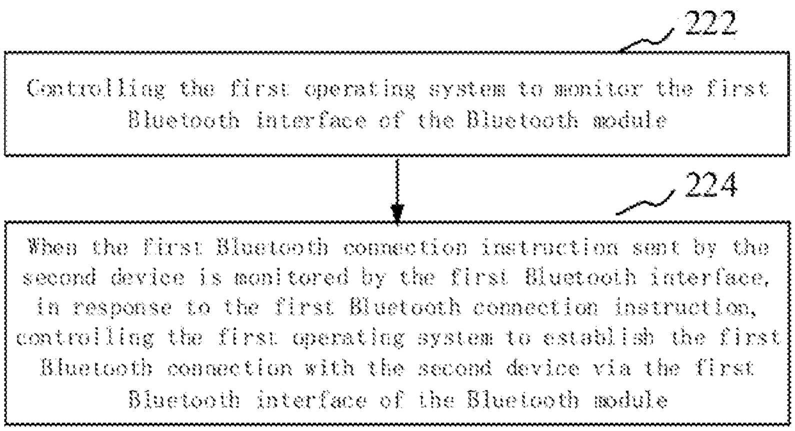
FIG. 3 is a flow chart of a method of establishing a first Bluetooth connection shown in FIG. 2.

Following the previous embodiment, the Bluetooth connection method is described. In response to the first Bluetooth connection instruction, the first operating system is controlled to establish the first Bluetooth connection with the second device via the Bluetooth module. The state of the second operating system is sent to the second device via the first Bluetooth connection, enabling the second device to determine, based on the state of the second operating system, whether to establish the second Bluetooth connection with the second operating system. In the present embodiment, as shown in FIG. 3, the block 220, in which the first operating system is controlled, in response to the first Bluetooth connection, to establish the first Bluetooth connection with the second device via the Bluetooth module, will be described in further detail. The block 220 includes the following blocks.

At block 222, the first operating system is controlled to monitor a first Bluetooth interface of the Bluetooth module.

Figure 4:
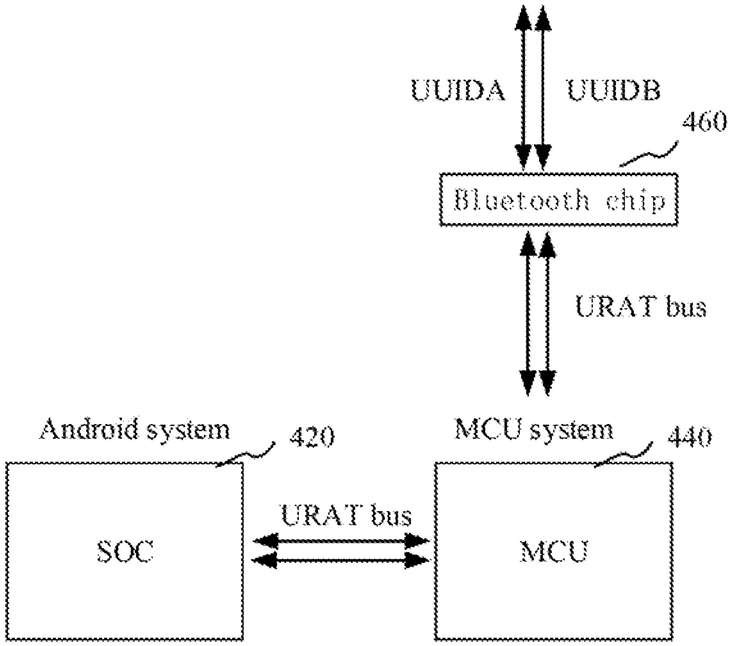
FIG. 4 is a hardware framework diagram of dual operating systems in an electronic device in according to an embodiment of the present disclosure.

As shown in FIG. 4, FIG. 4 is a hardware framework diagram of dual operating systems in an electronic device according to an embodiment of the present disclosure. The first processor may be the MCU, which runs the first operating system such as the MCU system. The second processor may be the system-on-a-chip (SOC), which runs the second operating system such as the Android system or the iOS system. The present disclosure does not limit the operating systems. A Bluetooth chip 460 may communicate with the MCU 440 via a UART bus, and the MCU 4420 communicates with the SOC 420 via the UART bus. The Bluetooth chip 460 may alternatively be a Bluetooth module integrated into the MCU 440, which is not limited by the present disclosure. The Bluetooth module in the first device (the smartwatch) includes two Bluetooth interfaces, a first Bluetooth interface (assumed to be named as UUID-B) and a second Bluetooth interface (assumed to be named as UUID-A). The UUID stands for the Universally Unique Identifier. The first Bluetooth interface is configured to receive the first Bluetooth connection instruction sent by the second device, and correspondingly, the second Bluetooth interface is configured to receive the second Bluetooth connection instruction sent by the second device. The first Bluetooth connection instruction is configured to instruct the second device to establish the Bluetooth connection with the first operating system in the first device. The second Bluetooth connection instruction is configured to instruct the second device to establish the Bluetooth connection with the second operating system in the first device. Each of the first Bluetooth interface (assumed to be named as UUID-B) and the second Bluetooth interface (assumed to be named as UUID-A) is an interface based on the RFCOMM protocol. The RFCOMM protocol provides a serial (9-pin-RS-232) emulation based on the L2CAP protocol and supports up to 60 communication connections between two Bluetooth devices.

When establishing the Bluetooth connection between the first device (smartwatch) and the second device (smartphone), i.e., when the Bluetooth module of the second device switches on, the second device sends the first Bluetooth connection instruction to the first Bluetooth interface (assumed to be named UUID-B) of the Bluetooth module in the first device. After the Bluetooth module of the first device switches on, the first device controls the first operating system to monitor both the first Bluetooth interface (UUID-B) and the second Bluetooth interface (UUID-A) of the Bluetooth module.

At block 224, when the first Bluetooth connection instruction sent by the second device is received via the first Bluetooth interface, in response to the first Bluetooth connection instruction, the first operating system is controlled to establish the first Bluetooth connection with the second device via the first Bluetooth interface of the Bluetooth module.

When the first Bluetooth connection instruction sent by the second device is monitored via the first Bluetooth interface (UUID-B), after the Bluetooth module in the first device receives the first Bluetooth connection instruction, the first device sends the first Bluetooth connection instruction to the first operating system. After monitoring the first Bluetooth connection instruction, the first operating system, in response to the first Bluetooth connection instruction, controls the first operating system to establish the first Bluetooth connection with the second device via the first Bluetooth interface of the Bluetooth module. In this way, the first operating system of the first device can transmit data to the second device via the established first Bluetooth connection.

In the embodiments of the present disclosure, the Bluetooth module of the first device includes two Bluetooth interfaces: the first Bluetooth interface and the second Bluetooth interface. The first device controls the first operating system to monitor both the first Bluetooth interface and the second Bluetooth interface of the Bluetooth module. When the first Bluetooth connection instruction sent by the second device is monitored via the first Bluetooth interface, the first device controls the first operating system to establish the first Bluetooth connection with the second device via the first Bluetooth interface of the Bluetooth module. Each of various Bluetooth connection instructions are received via a respective one of various Bluetooth interfaces of the Bluetooth module, and each of various operating systems within the first device is established with a respective one Bluetooth connection based on the respective Bluetooth interface. In this way, the first operating system in the first device supports the Bluetooth services, or both the first operating system and the second operating system support the Bluetooth services.

Figure 5:
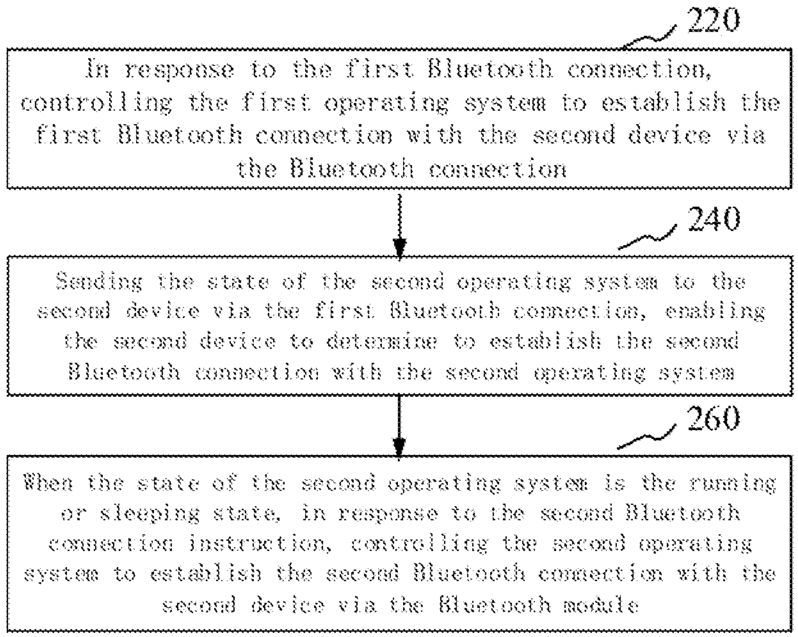
FIG. 5. is a flow chart of the Bluetooth connection method according to another embodiment of the present disclosure.

In addition to the previous embodiment, as shown in FIG. 5, a Bluetooth connection method is provided when the second device determines, based on the state of the second operating system, to establish the second Bluetooth connection with the second operating system. The method includes the following operations.

At block 260, when the state of the second operating system is the running state or the sleeping state, in response to a second Bluetooth connection instruction, the second operating system is controlled to establish the second Bluetooth connection with the second device via the Bluetooth module. The second Bluetooth connection instruction is an instruction, which is sent by the second device when the second device determines to establish the second Bluetooth connection with the second operating system based on the state of the second operating system.

When the state of the second operating system is the running state or the sleeping state, the second device determines, based on the state of the second operating system, to establish the second Bluetooth connection with the second operating system. At this moment, the second device sends the second Bluetooth connection instruction to the first device. The second Bluetooth connection instruction is configured to instruct the second device to establish the Bluetooth connection with the second operating system on the first device, and therefore, in a case that the second operating of the first device is the running state, after receiving the second Bluetooth connection instruction, the first device, in response to the second Bluetooth connection instruction, controls the second operating system to establish the second Bluetooth connection with the second device via the Bluetooth module. In a case that the second operating system on the first device is the sleeping sleep, after receiving the second Bluetooth connection instruction, the first device firstly wakes up the second operating system, and, in response to the second Bluetooth connection instruction, controls the second operating system to establish the second Bluetooth connection with the second device via the Bluetooth module.

The state of the second operating system being the running state means that a process of the second operating system of the first device is operating normally, and that is, the process of the second operating system occupies a memory of the second operating system. The state of the second operating system being the sleeping state means that the process of the second operating system of the first device is sleeping, and that is, the process in the second operating system is not closed but does not occupy the memory of the second operating system.

Specifically, in response to the second Bluetooth connection instruction, the first device controls the second operating system to establish the connection with the first operating system via the UART bus. The first operating system establishes the connection with the Bluetooth module via the UART bus. In this way, the second operating system establishes the second Bluetooth connection with the second device via the Bluetooth module.

As shown in FIG. 4, the first processor may be an MCU 440. The first processor is configured to run the first operating system, such as an MCU system (when the first device is the smartwatch, the MCI system may be the RTOS system). The second processor may be a system-on-chip SOC 420 and is configured to run the second operating system, such as the Android system. The Bluetooth module may be a Bluetooth chip 460. The Bluetooth chip 460 communicates with the MCU 440 via the UART bus, and then the MCU 440 communicates with the SOC 420 via the UART bus.

In some embodiments of the present disclosure, when the state of the second operating system is the running state or the sleeping mode, the second device determines, based on the state of the second operating system, to establish the second Bluetooth connection with the second operating system. The second device sends the second Bluetooth connection instruction to the first device. The first device, in response to the second Bluetooth connection instruction, controls the second operating system to establish the second Bluetooth connection with the second device via the Bluetooth module.

The second device obtains the state of the second operating system in the first device through the first Bluetooth connection established between the first device and the second device. Furthermore, when the state of the second operating system satisfies the condition for establishing the second Bluetooth connection, the second device sends the second Bluetooth connection instruction to the first device. The first device, in response to the second Bluetooth connection instruction, controls the second operating system to establish the second Bluetooth connection with the second device via the Bluetooth module. In this way, the second operating system in the first device establishes the second Bluetooth connection with the second device via the Bluetooth module. i.e., the second operating system in the first device is enabled to support the Bluetooth services.

Figure 6:
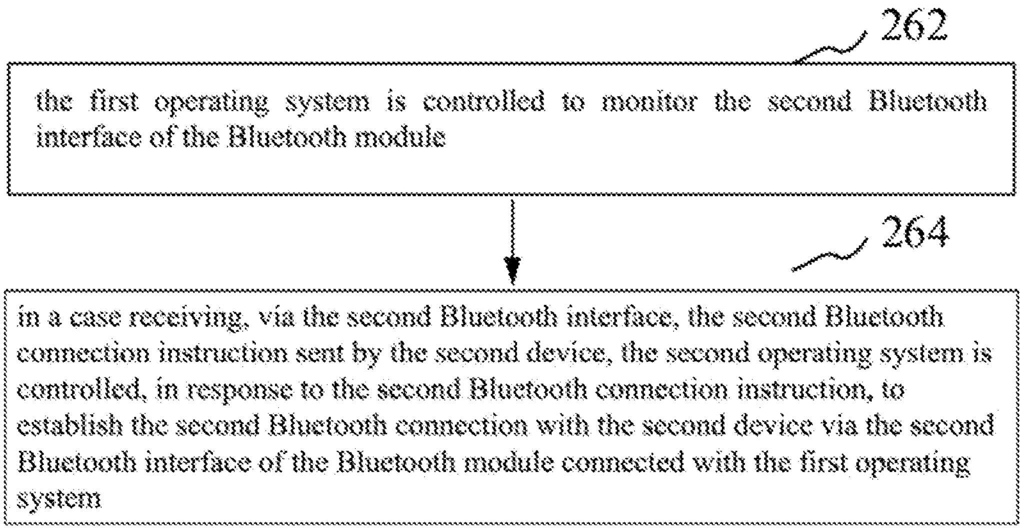
FIG. 6. is a flow chart of a method of establishing a second Bluetooth connection according to an embodiment of the present disclosure.

In addition to the previous embodiment, as shown in FIG. 6, the block 260, in which the second operating system is controlled, in response to the second Bluetooth connection instruction, to establish the second Bluetooth connection with the second device via the Bluetooth module, includes following operations.

In a case that the first operating system receives the second Bluetooth connection instruction sent from the second device via the second Bluetooth interface, in response to the second Bluetooth connection instruction, the second operating system is controlled to establish the second Bluetooth connection with the second device via the second Bluetooth interface of the Bluetooth module connected to the first operating system.

Specifically, the block 260, in which the second operating system is controlled, in response to the second Bluetooth connection instruction, to establish the second Bluetooth connection with the second device via the Bluetooth module, includes following operations.

At block 262, the first operating system is controlled to monitor the second Bluetooth interface of the Bluetooth module.

As shown in FIG. 4, the Bluetooth module in the first device (the smartwatch) includes two Bluetooth interfaces: the first Bluetooth interface (assumed to be named UUID-B) and the second Bluetooth interface (assumed to be named UUID-A), where the UUID stands for Universally Unique Identifier. The first Bluetooth interface is configured to receive the first Bluetooth connection instruction sent by the second device, and correspondingly, the second Bluetooth interface is configured to receive the second Bluetooth connection instruction sent by the second device. The first Bluetooth connection is configured to instruct the second device to establish the Bluetooth connection with the first operating system in the first device. The second Bluetooth connection is configured to instruct the second device to establish the Bluetooth connection with the second operating system in the first device. Each of the first Bluetooth interface (assumed to be named UUID-B) and the second Bluetooth interface (assumed to be named UUID-A) is an interface based on the RFCOMM protocol. The RFCOMM protocol provides a serial (9-pin-RS-232) emulation based on the L2CAP protocol and supports up to 60 communication connections between two Bluetooth devices.

When the Bluetooth connection between the first device (smartwatch) and the second device (smartphone) are established, i.e., after the Bluetooth module of the second device is switched on, the second device sends the first Bluetooth connection instruction to the first Bluetooth interface (assumed to be named UUID-B) of the Bluetooth module in the first device. After the Bluetooth module in the first device is switched on, the first device controls the first operating system to monitor both the first Bluetooth interface (UUID-B) and the second Bluetooth interface (UUID-A) of the Bluetooth module.

At block 264, in a case receiving, via the second Bluetooth interface, the second Bluetooth connection instruction sent by the second device, the second operating system is controlled, in response to the second Bluetooth connection instruction, to establish the second Bluetooth connection with the second device via the second Bluetooth interface of the Bluetooth module connected with the first operating system.

Specifically, the second operating system is controlled to send a third Bluetooth connection instruction to the first operating system. The second operating system is controlled to establish connection with the first operating system based on the third Bluetooth connection instruction. Furthermore, the first operating system is indirectly controlled to establish the second Bluetooth connection with the second device via the second Bluetooth interface of the Bluetooth module.

In a case that the second Bluetooth connection instruction sent by the second device is monitored via the second Bluetooth interface (UUID-A), i.e., after the Bluetooth module in the first device receives the second Bluetooth connection instruction, the second Bluetooth connection instruction is sent to the second operating system via the UART bus. After receiving the second Bluetooth connection instruction, the first operating system forwards, via the UART bus, the second Bluetooth connection instruction to the second operating system. The second operating system, in response to the second Bluetooth connection instruction, controls the second operating system to send the third Bluetooth connection instruction to the first operating system. The third Bluetooth connection instruction is configured to instruct the first operating system to establish the Bluetooth connection with the second device via the second Bluetooth interface (UUID-A) of the Bluetooth module. After the first operating system receives the third Bluetooth connection instruction, the second operating system controls the first operating system to establish the second Bluetooth connection with the second device via the second Bluetooth interface (UUID-A) of the Bluetooth module. In this way, the second operating system of the first device can transmit data to the second device via the established second Bluetooth connection.

In some embodiments of the present disclosure, in a case that the first operating system receives, via the second Bluetooth interface, the second Bluetooth connection instruction sent by the second device, in response to the second Bluetooth connection instruction, the first operating system controls the second operating system to establish the second Bluetooth connection with the second device via the second Bluetooth interface of the Bluetooth module connected to the first operating system.

Since the second operating system and the first operating system can communicate with each other via the UART bus, the second operating system tales the first operating system as a relay station to establish the second Bluetooth connection with the second device via the second Bluetooth interface of the Bluetooth module. In this way, the second operating system of the first device can establish the second Bluetooth connection with the second device via the Bluetooth module, enabling the second operating system of the first device to support the Bluetooth services.

In addition to the previous embodiment, when it is detected that the state of the second operating system is the running state or the sleeping state, the second operating system is controlled to establish the second Bluetooth connection with the second device via the Bluetooth module in response to the second Bluetooth connection instruction. In the present embodiment, in a case that the state of the second operating system switches from the running state or the sleeping state to a shutdown state, the second operating system is controlled to disconnect, via the Bluetooth module, the second Bluetooth connection established with the second device.

Specifically, in the case that the state of the second operating system is the running state or the sleeping state, in response to the second Bluetooth connection instruction, the second operating system is controlled to establish the second Bluetooth connection with the second device via the Bluetooth module.

Since the state of the second operating system may change at any time, when it is detected that the state of the second operating system switches from the running state or the sleeping state to the shutdown state, the second operating system is controlled to disconnect, via the Bluetooth module, the second Bluetooth connection established with the second device. The shutdown state of the second operating system means that the process of the second operating system in the first device is in the shutdown state, and that is, the process in the second operating system is closed and does not occupy the memory of the second operating system. When it is detected that the state of the second operating system switches from the running state to the sleeping state or vice versa, the second Bluetooth connection is maintained.

Conversely, when it is detected that the state of the second operating system switches from the shutdown state to the running state or the sleeping state, in response to the second Bluetooth connection instruction, the second operating system is controlled to re-establish the second Bluetooth connection with the second device via the Bluetooth module.

In some embodiments of the present disclosure, when it is detected that the state of the second operating system switches from the running state or the sleeping state to the shutdown state, the second operating system is controlled to disconnect, via the Bluetooth module, the second Bluetooth connection established with the second device. In this way, the second Bluetooth connection can be disconnected promptly after detecting a change in the state of the second operating system on real-time. When it is detected that the state of the second operating system switches from the shutdown state to the running state or the sleeping state, in response to the second Bluetooth connection instruction, the second operating system is controlled to re-establish the second Bluetooth connection with the second device via the Bluetooth module. In this way, it is ensured that the second Bluetooth connection is re-established promptly when the second operating system switches to the running state or the sleeping state. Therefore, it is ensured that the second operating system supports the Bluetooth services when the second operating system is in the running state or the sleeping state, and the second operating system can disconnect the second communication connection promptly when the second operating system switches to the shutdown state, such that power consumption of the first device is reduced.

In the previous embodiment, the Bluetooth connection method is described. The first operating system is controlled, in response to the first Bluetooth connection instruction, to establish the first Bluetooth connection with the second device via the Bluetooth module. The state of the second operating system is sent to the second device via the first Bluetooth connection, enabling the second device to determine, based on the state of the second operating system, whether to establish the second Bluetooth connection with the second operating system. In the present embodiment, the Bluetooth connection method further includes the following operations.

The first operating system is controlled to transmit, via the first Bluetooth connection, data of the first operating system to the second device.

Alternatively, the first operating system is controlled to transmit, via the first Bluetooth connection, the data of the first operating system to the second device; and the second operating system is controlled to transmit, via the second Bluetooth connection, the data of the second operating system to the second device.

The first device may be an electronic device running dual operating systems, such as the smartwatch. The first device may run the first operating system alone or run both the first operating system and the second operating system at the same time. That is, the first operating system in the first device is running all the time for implementing some basic business. The interface and the application of the second operating system running on the first device 120 can be different from the interface and the application of the first operating system running on the first device 120.

On the one hand, when only the first operating system is running in the first device and the second operating system is in the shutdown state, the first device, in response to the first Bluetooth connection, controls the first operating system to establish the first Bluetooth connection with the second device. Further, the first device obtains the state of the second operating system, and sends the state of the second operating system to the second device via the first Bluetooth connection; and the second device determines not to establish the second Bluetooth connection with the second operating system. At this moment, the first device controls the first operating system to transmit the data of the first operating system to the second device via the first Bluetooth connection. The data of the first operating system includes data generated by various applications in the first operating system. The present disclosure does not limit types and contents of the data.

On the other hand, when the first device simultaneously runs the second operating system and the first operating system, the second operating system may be in the running state or the sleeping state. The first device, in response to the first Bluetooth connection instruction, controls the first operating system to establish the first Bluetooth connection with the second device via the first Bluetooth interface of the Bluetooth module; obtains the state of the second operating system; sends the state of the second operating system to the second device via the first Bluetooth connection. The second device determines, based on the second operating system being in the running state or the sleeping state, to establish the second Bluetooth connection with the second operating system. Specifically, when the state of the second operating system of the first device is the running state, in response to the second Bluetooth connection instruction, the second operating system is controlled to establish the second Bluetooth connection with the second device via the second Bluetooth interface of the Bluetooth module. When the state of the second operating system of the first device is the sleeping state, after receiving the second Bluetooth connection instruction, the first device wakes up the second operating system firstly. Subsequently, in response to the second Bluetooth connection instruction, the first device controls the second operating system to establish the second Bluetooth connection with the second device via the Bluetooth module.

In this case, the first device controls the first operating system to transmit the data of the first operating system to the second device via the second Bluetooth connection. The first device further controls the second operating system to send, via the second Bluetooth connection, the data of the second operating system to the second device. The data of the second operating system includes the data generated by various applications in the second operating system. The present disclosure does not limit types and content of the data. In this way, the first device transmits the data of different operating systems to the second device separately via different Bluetooth connections, further improving an efficiency of data transmission. Furthermore, since the first operating system and the second operating system establish different Bluetooth connections via different Bluetooth interfaces of the Bluetooth module, the first operating system and the second operating system simultaneously transmit their respective systemic data to the second device via different Bluetooth connections.

In the present disclosure, when only the first operating system is running on the first device and the second operating system is in the shutdown state, only the first communication connection is established between the first device and the second device. Therefore, the first operating system is controlled to send the data of the first operating system to the second device via the first Bluetooth connection. When the second operating system is in the shutdown state, only the first communication connection is established between the first device and the second device, such that the power consumption of the first device is reduced.

When the first operating system and the second operating system are running simultaneously on the first device and the second operating system is in the running state or the sleeping state, both the first communication connection and the second communication connection are established between the first and second devices. Therefore, the first operating system is controlled to transmit the data of the first operating system to the second device via the first Bluetooth connection, and the second operating system is controlled to transmit the data of the second operating system to the second device via the second Bluetooth connection. In this way, the first device transmits data of different operating systems to the second device simultaneously via respective Bluetooth connections, further improving the efficiency of data transmission.

In the previous embodiment, at block 240, the state of the second operating system is sent to the second device via the first Bluetooth connection, enabling the second device to determine, based on the state of the second operating system, whether to establish the second Bluetooth connection with the second operating system. In the present embodiment, the operation of sending the state of the second operating system to the second device via the first Bluetooth connection is further described. The operation includes the following operations.

The state of the second operating system is obtained via the first operating system.

The state of the second operating system is sent to the second device via the first Bluetooth connection.

Specifically, in response to the first Bluetooth connection instruction, the first device controls the first operating system to establish, via the Bluetooth module, the first Bluetooth connection with the second device; obtains the state of the second operating system; and sends the state of the second operating system to the second device via the first Bluetooth connection. The second device determines, based on the state of the second operating system, whether to establish the second Bluetooth connection with the second operating system. When the state of the second operating system is sent to the second device via the first Bluetooth connection, the first operating system is controlled to obtain the state of the second operating system, and the state of the second operating system is sent to the second device via the first Bluetooth connection.

The state of the second operating system includes the running state, the sleeping state and the shutdown state. States of the second operating system may be grouped into more specific types, which is not limited herein.

Specifically, the second operating system transmits the state of the second operating system to the first operating system via the UART bus, such that the first operating system obtains the state of the second operating system. The first operating system sends the state of the second operating system to the second device via the first Bluetooth connection.

In the embodiments of the present disclosure, when the state of the second operating system is sent to the second device via the first Bluetooth connection, the first operating system is controlled to obtain the state of the second operating system, and then the state of the second operating system is sent to the second device via the first Bluetooth connection. In this way, the state of the second operating system is sent to the second device via the first Bluetooth connection in real-time, enabling the second device to determine, based on the state of the second operating system, whether to establish the second Bluetooth connection with the second operating system.

Figure 7:
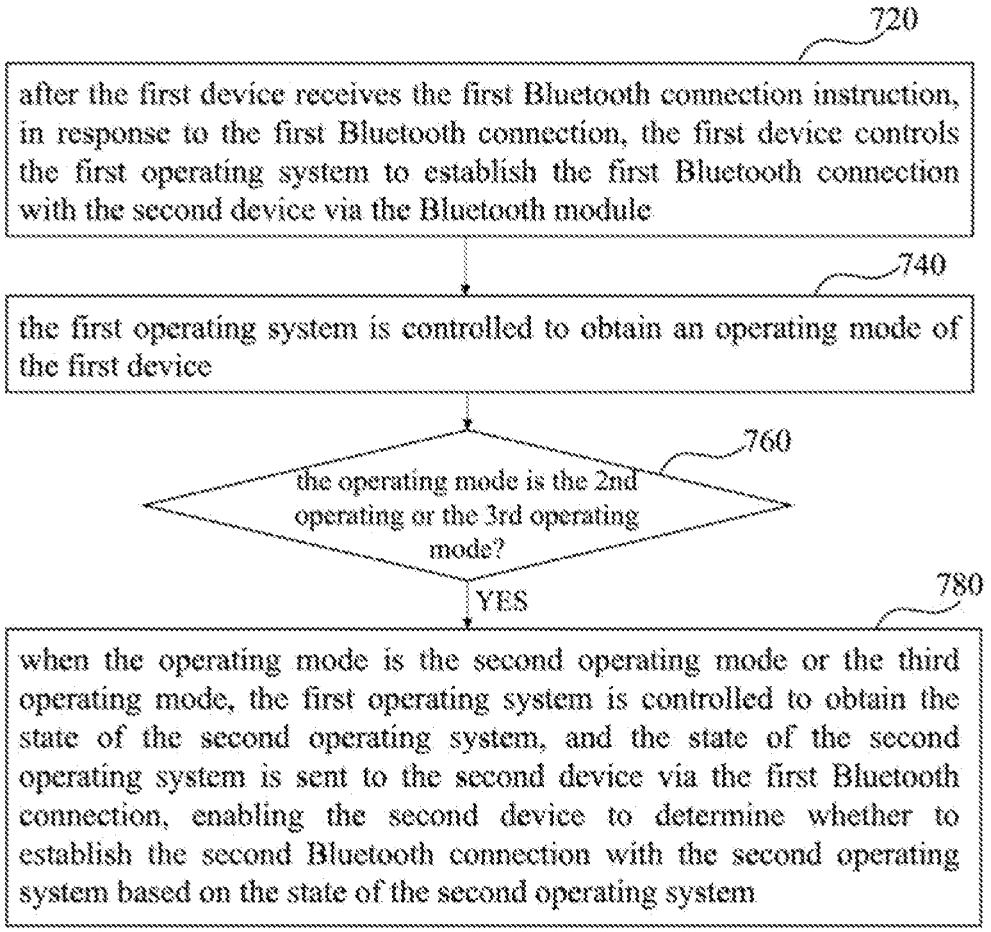
FIG. 7. is a flow chart of the Bluetooth connection method according to still another embodiment of the present disclosure.

In an embodiment, as shown in FIG. 7, a Bluetooth connection method is provided, including the following operations.

At block 720, after the first device receives the first Bluetooth connection instruction, in response to the first Bluetooth connection, the first device controls the first operating system to establish the first Bluetooth connection with the second device via the Bluetooth module.

At block 740, the first operating system is controlled to obtain an operating mode of the first device. The operating mode includes a first operating mode, a second operating mode and a third operating mode. In the first operating mode, the second operating system is in the shutdown state. In the second operating mode, the second operating system is in the running state or the sleeping state. In the third operating mode, the second operating system is in the running state.

At block 760, it is determined that the operating mode is the second operating or the third operating mode.

At block 780, when the operating mode is the second operating mode or the third operating mode, the first operating system is controlled to obtain the state of the second operating system, and the state of the second operating system is sent to the second device via the first Bluetooth connection, enabling the second device to determine whether to establish the second Bluetooth connection with the second operating system based on the state of the second operating system.

Specifically, as shown in FIG. 7, when the Bluetooth connection is established between the first device and the second device, the second device sends the first Bluetooth connection instruction to the first device. After receiving the first Bluetooth connection instruction, the first device, in response to the first Bluetooth connection instruction, controls the first operating system to establish the first Bluetooth connection with the second device via the Bluetooth module.

The second operating system is operating at different states according to different operating modes of the first device. For example, the operating mode of the first device 120 includes, the first operating mode, the second operating mode and the third operating mode. The first device may switch between these modes. The first operating mode is also known as a light-intelligent mode. In the first operating mode, the second operating system is in the shutdown state. The second operating mode is also known as a hybrid mode. In the second operating mode, the second operating system is in the running state or the sleeping state. The third operating mode is also known as a high-performance mode. In the third operating mode, the second operating system is in the running state. The operating mode of the first device may include more operating modes, which is not limited herein. The operating modes and the states of the second operating system are in one-to-one correspondence with each other.

The first device then controls the first operating system to obtain the operating mode of the first device. Specifically, the first device receives an operation performed by a user and switches among the first operating mode, the second operating mode and the third operating mode. Once the first device switches to a specific one of the operating modes, the first operating system receives switching information and records a current operating mode of the first device based on the switching information.

The first operating system determines whether the current operating mode is the second operating mode or the third operating mode. When the operating mode is the second operating mode or the third operating mode, the second operating system is in the running state or the sleeping state, and that is, the state of the second operating system satisfies the condition for establishing the second Bluetooth connection. In this case, the first operating system is controlled to obtain the state of the second operating system, and the state of the second operating system is sent to the second device via the first Bluetooth connection. When the operating mode is the first mode, the second operating system is in the shutdown state. That is, the state of the second operating system does not satisfy the condition for establishing the second Bluetooth connection, and the operation of controlling the first device to obtain the state of the second operating system and sending the state of the second operating system to the second device via the first Bluetooth connection does not need to be performed. When the operating mode of the first device is the first operating mode, the power consumption of the first device can be substantially reduced without performing any subsequent operation.

In the embodiments of the present disclosure, since the state of the second operating system varies depending on the operating mode of the first device, the first operating system can be controlled to obtain the operating mode of the first device. The state of the second operating system is obtained based on the operating mode of the first device, and it is determined, based on the state of the second operating system, whether to perform the operation of establishing the second Bluetooth connection. When the operating mode is the second operating mode or the third operating mode, the operation of controlling the first operating system to obtain the state of the second operating system and sending the state of the second operating system to the second device via the first Bluetooth connection is performed. When the operating mode is the first operating mode, the aforementioned operations do not need to be performed. Once the first device is in the operating mode, it can be determined whether to perform the operation of establishing the second Bluetooth connection. When the operating mode is the second operating mode or the third operating mode, the operation of establishing the second communication connection is triggered. However, when the operating mode is the first operating mode, the operation of establishing the second communication connection is not triggered. In this way, the power consumption of the first device is greatly reduced.

In an embodiment, the first processor includes the MCU, and the second processor includes the SOC. An operating power consumption of the first process is less than that of the second processor.

FIG. 4 is a hardware framework diagram of the dual operating systems of an electronic device in an embodiment. The first device 120 includes the SOC 420, the MCU 440 and the Bluetooth chip 460. The MCU can be independent of or integrated into the SCO, which is not limited herein. The first operating system of the dual operating systems may be run on the MCU 440, and the second operating system of the dual operating systems may be run on the SOC 420. The Bluetooth chip 460 may achieve functions of the Bluetooth module. The Bluetooth chip 460 communicates with the MCU 440 via the UART bus, and the MCU 440 communicates with the SOC 420 via the UART bus. For example, the first operating system may be the MCU system, and the second operating system may be the Android or the IOS system, which is not limited herein. The SOC has a processor that is independent of the MCU, and the processor of the SOC and the MCU are used to perform different tasks independent from each other. As shown in FIG. 4, since the SOC 420 does not directly communicate with the Bluetooth chip 460, the SOC 420 needs to communicate with the Bluetooth chip 460 indirectly via the MCU 440.

Figure 8:
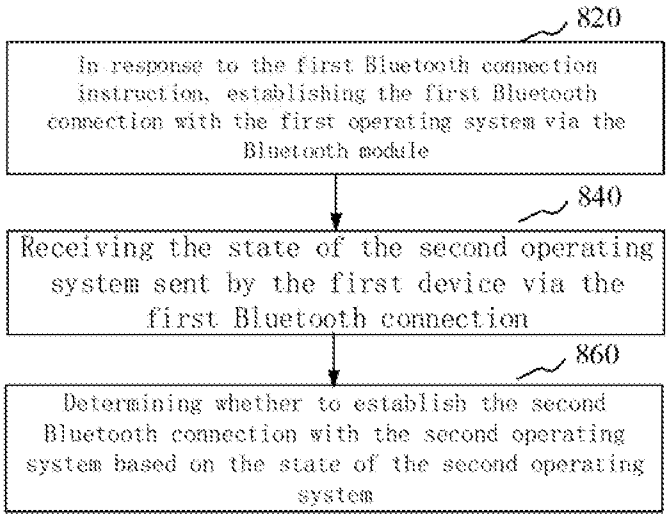
FIG. 8. is a flow chart of the Bluetooth connection method according to an embodiment of the present disclosure.

In an embodiment, the Bluetooth connection method is provided and is applied to the second device (the smartphone). The first device (the smartwatch) includes the first processor, the second processor and the Bluetooth module. The first processor is communicatively connected to the second processor, and the Bluetooth module is communicatively connected to the first processor. The first processor is configured to run the first operating system, and the second processor is configured to run the second operating system. The operating power consumption of the first processor is less than that of the second processor. As shown in FIG. 8, the method includes the following operations.

At block 820, in response to the first Bluetooth connection instruction, the first Bluetooth connection is established, via the Bluetooth module, with the first operating system.

Herein, the first device is the electronic device running dual operating systems, such as the smartwatch. The first device may run the first operating system alone or run both the first operating system and the second operating system at the same time. That is, the first operating system of the first device is running all the time for implementing some basic business. The interface and the application of the second operating system running on the first device 120 may be different from the interface and application of the first operating system running on the first device 120.

The second device is an external device for establishing the Bluetooth connection with the first device. The second device may be the device supporting only one operating system or the device supporting dual operating systems, which is not limited herein. For example, the second device is the smartphone, which is not limited herein.

When the Bluetooth connection between the first device and the second device is established, the first device sends the first Bluetooth connection instruction to the second device, or the second device proactively triggers the generation of the first Bluetooth connection instruction. Since the first operating system of the electronic device is running all the time, in response to the first Bluetooth connection instruction, the second device may establish, via the Bluetooth module in the first device, the first Bluetooth connection with the first operating system. The first Bluetooth connection instruction is configured to instruct the second operating system to establish the first Bluetooth connection with the first device via the Bluetooth module.

At block 840, the state of the second operating system, which is sent by the first device, is received via the first Bluetooth connection.

After the first Bluetooth connection is established between the first device and the second device, the first operating system in the first device may communicate with the second device via the Bluetooth module. Thus, the first operating system obtains the state of the second operating system in the first device and sends the state of the second operating system to the second device via the first Bluetooth connection. In this way, the second device obtains, via the first Bluetooth connection, the state of the second operating system in the first device in real-time.

At block 860, the second Bluetooth connection with the second operating system is established based on the state of the second operating system.

The second device then determines whether to establish the second Bluetooth connection with the second operating system based on the state of the second operating system. That is, at this moment, when the second operating system on the first device is in the running state or in the sleeping state, the second device determines that the second operating system in the first device needs to support the Bluetooth services, and therefore, the second device determines to establish the second Bluetooth connection with the second operating system. The Bluetooth connection between the second device and the second operating system may be the communicative connection established based on the first Bluetooth connection, or a communicative connection that is completely independent of the first Bluetooth connection. The present disclosure does not limit the Bluetooth connection.

When the second operating system in the first device is in the shutdown state, the second device determines that the second operating system in the first device does not need to support the Bluetooth services and determines not to establish the second Bluetooth connection with the second operating system of the first device.

In the present disclosure, the second device, in response to the first Bluetooth connection instruction, establishes the first Bluetooth connection with the first operating system via the Bluetooth module. Subsequently, the second device receives, via the first Bluetooth connection, the state of the second operating system sent by the first device; and determines, based on the state of the second operating system, whether to establish the second Bluetooth connection with the second operating system.

The second device determines, based on the state of the second operating system, whether to establish the second Bluetooth connection in addition to the established first Bluetooth connection, enabling the second operating system to support the Bluetooth services. In this way, the second device obtains the state of the second operating system in the first device to determine whether to establish the second Bluetooth connection with the first device, enabling the operating system that is currently running on the first device to support the Bluetooth services.

In addition to the previous embodiment, the Bluetooth connection method is described. The second device, in response to the first Bluetooth connection instruction, establishes, via the Bluetooth module, the first Bluetooth connection with the first operating system. The second device receives, via the first Bluetooth connection, the state of the second operating system sent by the first device; and determines, based on the state of the second operating system, whether to establish the second Bluetooth connection with the second operating system. In the present embodiment, specific implementation of determining, based on the state of the second operating system, whether to establish the second Bluetooth connection with the second operating system is described in detail and includes following operations.

When the state of the second operating system is the running state or the sleeping state, the second Bluetooth connection is established, via the second Bluetooth interface of the Bluetooth module, with the second operating system.

The second operating system sends the state of the second operating system to the first operating system via the UART bus, such that the first operating system obtains the state of the second operating system. The first operating system sends the state of the second operating system to the second device via the first Bluetooth connection.

Specifically, the first device obtains the state of the second operating system based on the operating mode of the first device. In detail, the first device controls the first operating system to obtain the operating mode of the first device. The operating mode includes the first operating mode, the second operating mode and the third operating mode. The second operating system is in the shutdown state when the operating mode is the first operating mode, the second operating system is in the running state or the sleeping state when the operating mode is the second operating mode, and the second operating system is in the running state when the operating mode is the third operating mode. Therefore, when the operating mode is the second operating mode or the third operating mode, the first operating system is controlled to obtain the state of the second operating system, and the state of the second operating system is sent to the second device via the first Bluetooth connection.

At this moment, the second device receives, via the first Bluetooth connection, the state of the second operating system sent by the first device. When the second operating system in the first device is in the running state or the sleeping state, the second operating system determines that the second operating system needs to support the Bluetooth services, such that the second device determines to establish the second Bluetooth connection with the second operating system.

In the embodiments of the present disclosure, the second device receives, via the first Bluetooth connection, the state of the second operating system sent by the first device. When the second operating system in the first device is in the running state or the sleeping state, the second device determines to establish the second Bluetooth connection with the second operating system. Therefore, it is ensured that, when the second operating system on the first device is in the running state or the sleeping state, applications in the second operating system communicate with the second device via the second Bluetooth connection. In this way, applications in the second operating system in the first device being unable to normally communicate with the second device, which occurs in the art due to no Bluetooth connection being established between the second device and the first device when the second operating system in the first device is in the running state or the sleeping state, can be avoided. That is, communicate with the second device via the second Bluetooth connection being unavailable can be avoided.

In addition to the previous embodiment, the specific implementation of determining, based on the state of the second operating system, whether to establish the second Bluetooth connection with the second operating system is described in detail and includes following operations. When the state of the second operating system is the shutdown state, it is determined that the second Bluetooth connection with the second operating system is not established.

The second operating system sends the state of the second operating system to the first operating system via the UART bus, such that the first operating system obtains the state of the second operating system. The first operating system then sends the state of the second operating system to the second device via the first Bluetooth connection.

At this moment, the second device receives, via the first Bluetooth connection, the state of the second operating system sent by the first device. When the second operating system in the first device is in the shutdown state, the second device determines that the second operating system does not need to support the Bluetooth services, such that the second device determines not to establish the second Bluetooth connection with the second operating system.

In the embodiments of the present disclosure, the second device receives, via the first Bluetooth connection, the state of the second operating system sent by the first device. When the second operating system in the first device is in the shutdown state, the second device determines not to establish the second Bluetooth connection with the second operating system. In this way, when the second operating system is in the shutdown state, the second Bluetooth connection with the second operating system is not established, such that the power consumption of the first device is reduced.

Figure 9:
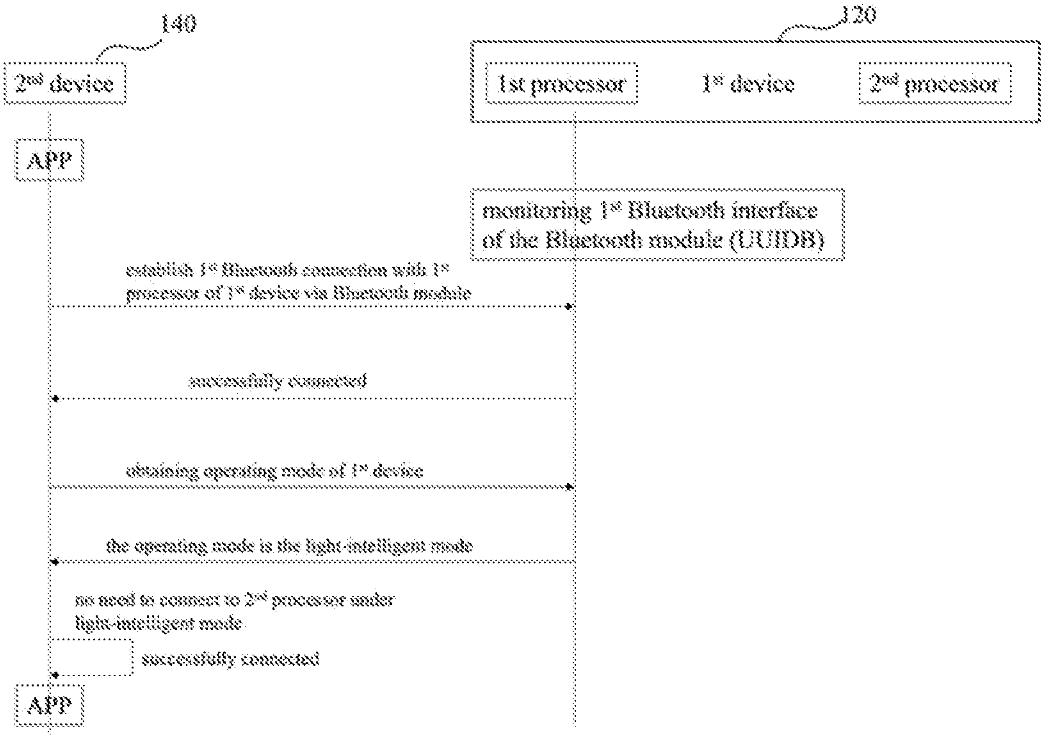
FIG. 9. is a timing diagram of Bluetooth connection when a first device operates in a light-intelligent mode according to an embodiment of the present disclosure.

In an embodiment, the method is applied by the first device. The first device includes the first processor, the second processor and the Bluetooth module. The first processor is communicatively connected to the second processor, and the Bluetooth module is communicatively connected to the first processor. The first processor is configured to run the first operating system, and the second processor is configured to run the second operating system. The operating power consumption of the first processor is less than that of the second processor. FIG. 9. is a timing diagram of the Bluetooth connection when the first device operates in the light-intelligent mode. When the operating mode of the first device is the light-intelligent mode, a Bluetooth connection method is provided and includes the following operations.

The first operating system is controlled to monitor the first Bluetooth interface and the second Bluetooth interface of the Bluetooth module.

In a case that the first Bluetooth connection instruction sent by the second device is monitored via the first Bluetooth interface, the first operating system is controlled to establish the first Bluetooth connection with the second device via the first Bluetooth interface of the Bluetooth module.

The first operating system is controlled to obtain the operating mode of the first device.

It is determined whether the operating mode is the hybrid mode or the high-performance mode. When the operating mode is the light-intelligent mode, the second device determines, based on the state of the second operating system, not to establish the second Bluetooth connection with the second operating system (the Android system). When the operating mode is the light-intelligent mode, the second operating system (the Android system) is in the shutdown state. When the operating mode is the hybrid mode, the second operating system (the Android system) is in the running state or the sleeping state. When the operating mode is the high-performance mode, the second operating system is in the running state.

Figure 10:
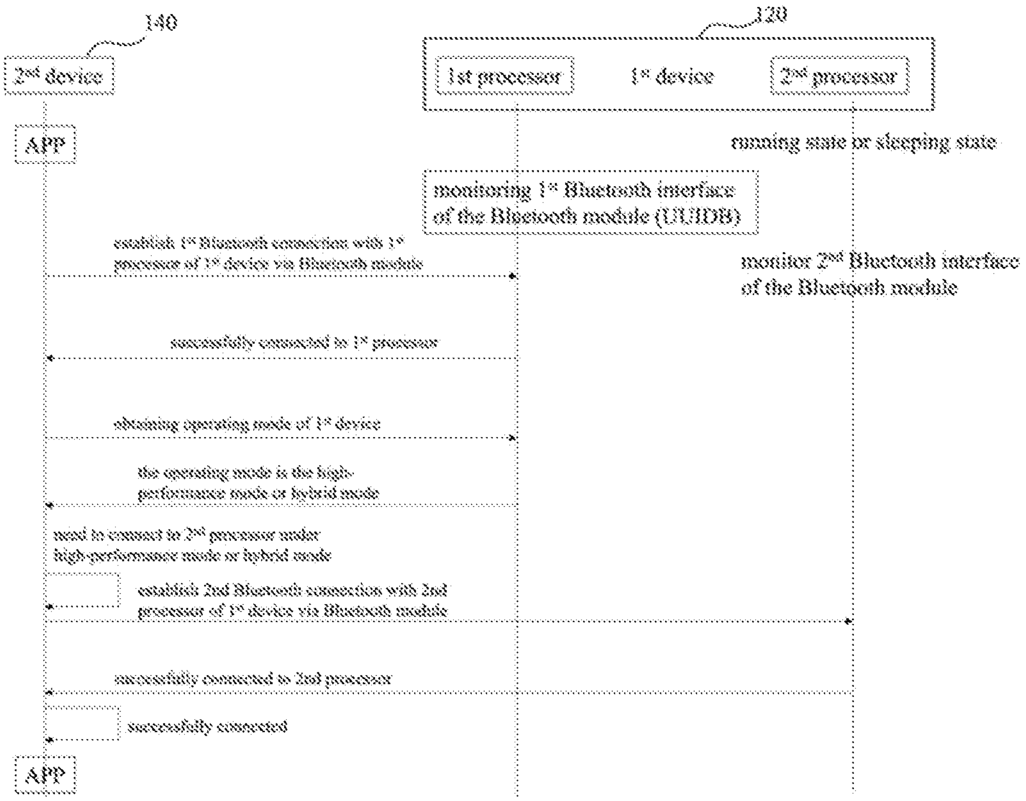
FIG. 10. is a timing diagram of Bluetooth connection when the first device operates in a hybrid or high-performance mode according to another embodiment of the present disclosure.

FIG. 10. is a timing diagram of the Bluetooth connection when the first device operates in the hybrid mode or the high-performance mode. The Bluetooth connection method, when the operating mode of the first device is the hybrid mode or the high-performance mode, is provided and includes following operations.

The first operating system is controlled to monitor the first Bluetooth interface and the second Bluetooth interface of the Bluetooth module.

When the first Bluetooth connection instruction sent by the second device is monitored via the first Bluetooth interface, in response to the first Bluetooth connection instruction, the first operating system is controlled to establish the first Bluetooth connection with the second device via the first Bluetooth interface of the Bluetooth module.

The first operating system is controlled to obtain the operating mode of the first device.

The operating mode of the first device is sent to the second device via the first Bluetooth connection.

The second device determines whether the operating mode is the hybrid mode or the high-performance mode. When the operating mode is the hybrid mode or the high-performance mode, the second device determines the state of the second operating system (the Android system) based on the operating mode, and determines to establish the second Bluetooth connection with the second operating system (the Android system) based on the state of the second operating system.

In the embodiments of the present disclosure, the Bluetooth connection method is provided when the operating mode of the first device is the light-intelligent mode. The first operating system is controlled to establish the first Bluetooth connection with the second device via the first Bluetooth interface of the Bluetooth module. When the operating mode of the first device is the hybrid mode or the high-performance mode, the first operating system is controlled to establish the first Bluetooth connection with the second device via the first Bluetooth interface of the Bluetooth module. The operating mode of the first device is sent to the second device via the first Bluetooth connection. The second device determines the state of the second operating system (the Android system) based on the operating mode of the first device and then determines to establish the second Bluetooth connection with the second operating system (the Android system) based on the state of the second operating system (the Android system). In this way, when the operating mode is at least one of the light-intelligent mode, the hybrid mode, and the high-performance mode, the Bluetooth connection between the second device and the operating system corresponding to the operating mode in which the first device is current running is ensured to be established normally.

Figure 11:
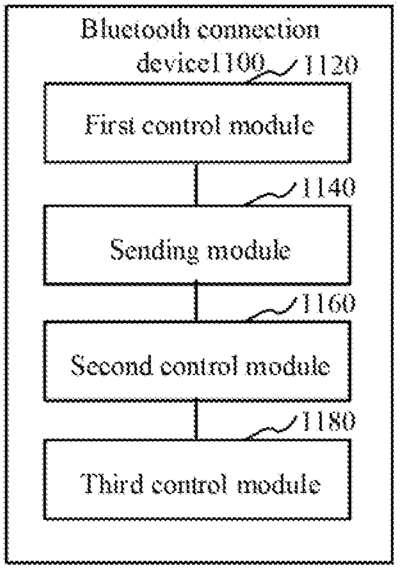
FIG. 11. is a structural block diagram of a Bluetooth connection apparatus according to an embodiment of the present disclosure.

In an embodiment, FIG. 11 is a structural block view of the Bluetooth connection device 1100 applied in the first device. The first device includes the first processor, the second processor and the Bluetooth module. The first processor is communicatively connected to the second processor, and the Bluetooth module is communicatively connected to the first processor. The first processor is configured to run the first operating system, and the second processor is configured to run the second operating system. The apparatus includes the following.

A first control module 1120 is configured to control, in response to the first Bluetooth connection instruction, the first operating system to establish the first Bluetooth connection with the second device via the Bluetooth module.

A sending module 1140 is configured to send the state of the second operating system to the second device via the first Bluetooth connection and to control the second device to determine, based on the state of the second operating system, to establish the second Bluetooth connection with the second operating system.

In an embodiment, the first control module 1120 includes the following.

A first monitor unit is configured to control the first operating system to monitor the first Bluetooth interface of the Bluetooth module.

In a case that the first Bluetooth connection instruction sent by the second device is monitored by the first Bluetooth interface, a first Bluetooth connection establishment unit is configured to control, in response to the first Bluetooth connection instruction, the first operating system to establish the first Bluetooth connection with the second device via the first Bluetooth interface of the Bluetooth module.

In an embodiment, the first Bluetooth connection apparatus 1100 further includes the following.

A second control module 1160 is configured to control, in response to the second Bluetooth connection, the second operating system to establish the second Bluetooth connection with the second device via the Bluetooth module, in a case that the state of the second operating system is the running state or the sleeping state. The second Bluetooth connection instruction is the instruction, which is sent by the second device when the second device determines to establish the second Bluetooth connection with the second operating system based on the state of the second operating system.

In an embodiment, the second control module 1160 is configured to control, in response to the second Bluetooth connection, the second operating system to establish the second Bluetooth connection with the second device via the second Bluetooth interface of the Bluetooth module connected to the first operating system, in the case that the first operating system receives, via the second Bluetooth interface, the second Bluetooth connection instruction sent by the second device.

In an embodiment, the Bluetooth connection apparatus 1100 further includes the following.

A third control module 1180 is configured to control the second operating system to disconnect, via the Bluetooth module, the second Bluetooth connection established with the second device, in the case that the state of the second operating system switches from the running state or the sleeping state to the shutdown state.

In an embodiment, the Bluetooth connection apparatus 1100 further includes the following.

A first data-sending module is configured to control the first device to send data of the first operating system to the second device via the first Bluetooth connection.

Alternatively, a second data-sending module is configured to control the first device to send data of the first operating system to the second device via the first Bluetooth connection and control the first operating system to send data of the second operating system to the second device via the second Bluetooth connection.

In an embodiment, the sending module 140 is configured to control the first operating system to obtain the state of the second operating system and send the state of the second operating system to the second device via the first Bluetooth connection.

In an embodiment, the Bluetooth connection apparatus 1100 further includes the following.

An operating mode obtaining module is configured to control the first operating system to obtain the operating mode of the first device. The operating mode includes the first operating mode, the second operating mode and the third operating mode. The second device is in the shutdown state when the operating mode is the first operating mode. The second device is in the running state or the sleeping state when the operating mode is the second operating mode. The second device is in the running state when the operating mode is the third operating mode.

In the case that the operating mode is the second operating mode or the third operating mode, the first operating system is controlled to obtain the state of the second operating system and send the state of the second operating system to the second device via the first Bluetooth connection.

In an embodiment, the first processor is the MCU and the second processor is the SOC. The operating power consumption of the first processor is less than that of the second processor.

Figure 12:
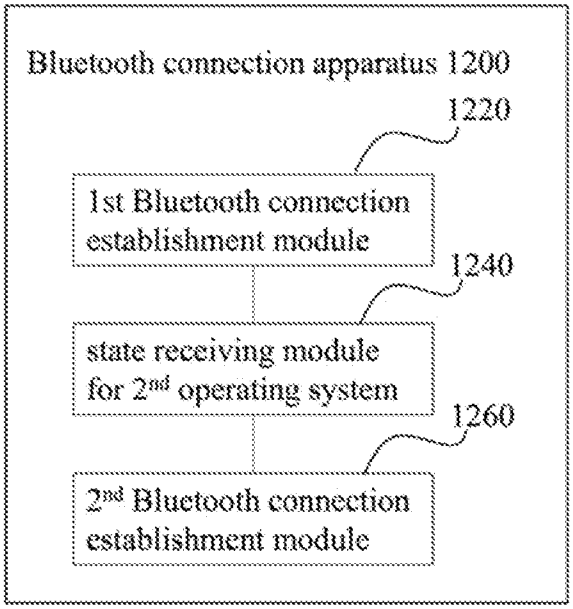
FIG. 12. is a structural block diagram of a Bluetooth connection apparatus according to an embodiment of the present disclosure.

In an embodiment, as shown in FIG. 12, a Bluetooth connection apparatus 1200 applied to the second device is provided. The first device includes the first processor, the second processor and the Bluetooth module. The first processor is communicatively connected to the second processor, and the Bluetooth module is communicatively connected to the first processor. The first processor is configured to run the first operating system, and the second processor is configured to run the second operating system. The operating power consumption of the first processor is less than that of the second processor. The Bluetooth connection apparatus 1200 includes the following.

A first Bluetooth connection establishment module 1220 is configured to establish, in response to the first Bluetooth connection instruction, the first Bluetooth connection with the first operating system via the Bluetooth module.

A state receiving module 1240 of the second operating system is configured to receive the state of the second operating system sent by the first device via the first Bluetooth connection.

A second Bluetooth connection establishment module 1260 is configured to establish the second Bluetooth connection with the second operating system based on the state of the second operating system.

In an embodiment, the second Bluetooth connection establishment module 1260 is configured to establish the second Bluetooth connection with the second operating system via the second Bluetooth interface, in the case that the state of the second operating system is the running state or the sleeping state.

In an embodiment, the Bluetooth connection apparatus 1200 further includes the following.

A second Bluetooth connection non-establishing module is configured to determine not establishing the second Bluetooth connection with the second operating system, in the case that the state of the second operating system is the shutdown state.

It should be understood that though the individual operations in the flowchart of the above-described figures are shown sequentially as indicated by the arrows, these operations are not necessarily executed sequentially in the order indicated by the arrows. Unless expressly stated, there is no strict order regarding the execution of these operations, and these operations may be executed in other orders. Moreover, at least a number of the operations in the above-described figures may include a number of sub-operations or a number of phrases, which are not necessarily executed at the same moment of completion, but may be executed at different moments. The order of execution of these sub-operations or phases is not necessarily sequential, but may be executed in turn or alternatively with at least a number of the sub-operations or phrases of the other operations or of the other operations.

The above divisions of the individual modules in the Bluetooth connection device are for illustrative purposes only. In other embodiments, the Bluetooth connection device may be divided into different modules as required to fulfil all or part of the functions of the above Bluetooth connection device.

Specific limitations on the Bluetooth connection device can be found in the above limitations on the Bluetooth connection method. The various modules in the above-described Bluetooth connection device may be achieved in whole or in part by software, hardware and combinations thereof. Each of the above modules may be embedded in the processor in the computer device in the form of hardware or independently, or may be stored in the memory in the computer device in the form of software to facilitate the processor to call for the execution of the corresponding operation of each of the above module.

In one embodiment, an electronic device including a memory and a processor is provided. The memory stores a computer program. The computer program, when executed by the processor, causes the processor to perform an operation of a Bluetooth connection method provided in the above embodiments.

In performing a Bluetooth connection method, the processor can perform a sending task in cooperation with a transmitter. For example, the transmitter can send instructions to the sender. The sender performs the sending task. after receiving instructions. The processor can also perform a receiving task in cooperation with a receiver. For example, the processor can send instructions to the receiver, and the receiver performs the receiving task after receiving instructions. Alternatively, the processor can also perform a display task in cooperation with a monitor. For example, the processor can send display instructions to the monitor. The sender performs the display task after receiving the display instruction. The processor can perform various tasks in cooperation with other processing modules. The present disclosure does not limit this.

Figure 13:
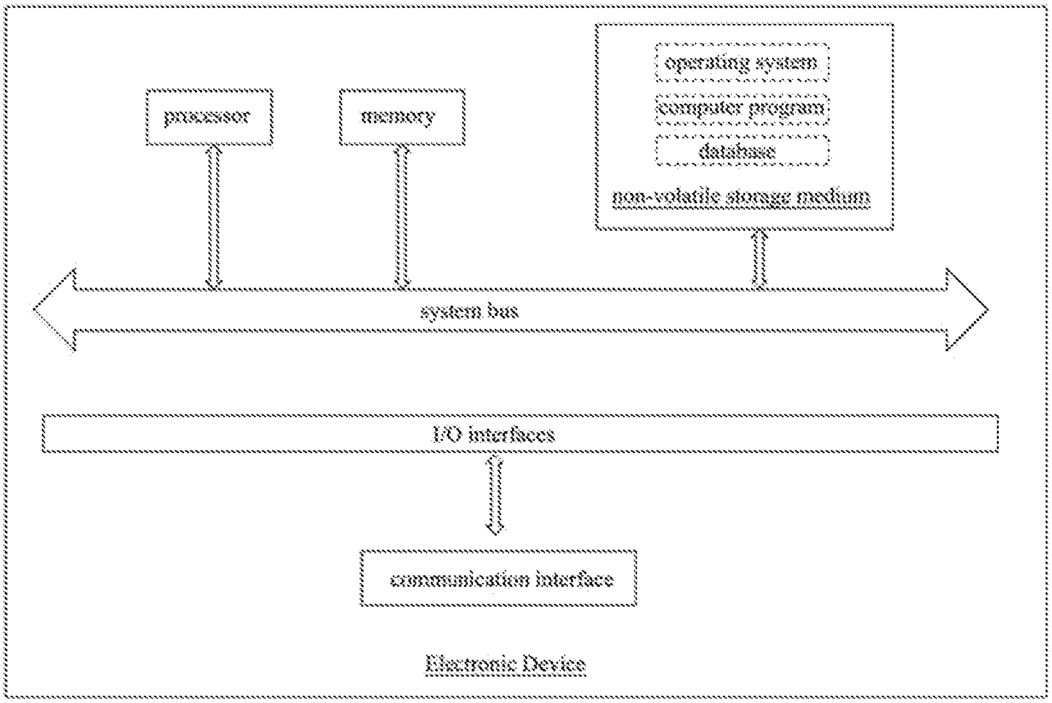
FIG. 13. is a structural schematic view of an interior of an electronic device according to an embodiment of the present disclosure.

FIG. 13. is a schematic internal structure diagram of an electronic device in one embodiment. The electronic device can be any terminal device such as a mobile phone, a tablet computer, a laptop, a desktop computer, a Personal Digital Assistant (PDA), a Point of Sales (POS), an in-vehicle computer, a wearable device and the like. The electronic device includes a processor and a memory connected via a system bus. The processor can include one or more processing units. The processor can be a Central Processing Unit (CPU), a Digital Signal Processing (DSP) etc. The memory can include a non-volatile storage medium and an internal memory. The non-volatile storage medium stores the operating system and computer programs. The computer program can be executed by the processor for implementing one of the image processing methods provided in the following various embodiments. The internal memory provides a cached runtime environment for the operating system computer program in the non-volatile storage medium.

The implementation of the individual modules in the Bluetooth connection device provided in some embodiments of the present disclosure can be in the form of a computer program. The computer program can run on the electronic device and the memory of the electronic device. The computer program can be stored in the memory of the electronic device. When the computer program is executed by the processor, operations described in some embodiment of the present disclosure are implemented.

Embodiments of the present disclosure also provide a computer-readable storage medium. One or more non-volatile computer-readable storage media including computer-executable instructions. When the computer-executable instructions are executed by one or more processors, the operations of the Bluetooth connection method are performed by the processors.

A computer program product comprising instructions which, when running on a computer, cause the computer to perform a Bluetooth connection method.

Any reference to a memory, storage, database, or other medium as used in some embodiments of the present disclosure can include non-volatile or volatile memory. Suitable non-volatile memory can include read-only memory (ROM), programmable ROM (PROM), electrically programmable ROM (EPROM), electrically erasable programmable ROM (EEPROM), or flash memory. The volatile memory can include random access memory (RAM), which is used as an external cache memory. RAM can be in various forms, including but not limited to static RAM (SRAM), dynamic RAM (DRAM), synchronous DRAM (SDRAM), double data rate SDRAM (DDR SDRAM), enhanced SDRAM (ESDRAM), synchronous link DRAM (SL-DRAM), memory bus (Rambus) direct RAM (RDRAM), direct memory bus dynamic RAM (DRDRAM) and memory bus dynamic RAM (RDRAM).

The above Bluetooth connection embodiments express only several embodiments of the present disclosure, which are described in a more specific and detailed manner, but are not to be construed as a limitation of the scope of the patent of the present disclosure. It should be noted that, for a person having ordinary skill in the art, several deformations and improvements can be made without departing from the conception of the present disclosure, all of which fall within the scope of protection of the present disclosure. Therefore, the scope of protection of the patent application shall be subject to the attached claims.

What is claimed is:

1. A Bluetooth connection method, performed by a first device, wherein, the first device comprises a first processor, a second processor, and a Bluetooth module; the first processor is communicatively connected to the second processor; the Bluetooth module is communicatively connected to the first processor; the first processor is configured to run a first operating system, the second processor is configured to run a second operating system; and the method comprises:

in response to a first Bluetooth connection instruction, controlling the first operating system to establish a first Bluetooth connection with a second device via the Bluetooth module;

sending a state of the second operating system to the second device via the first Bluetooth connection, enabling the second device to determine, based on the state of the second operating system, whether to establish a second Bluetooth connection with the second operating system.

2. The method according to claim 1, wherein, controlling, in response to the first Bluetooth connection instruction, the first operating system to establish the first Bluetooth connection with the second device via the Bluetooth module, comprises:

controlling the first operating system to monitor a first Bluetooth interface of the Bluetooth module;

in a case that a first Bluetooth connection instruction sent by the second device is monitored via the first Bluetooth interface, in response to the first Bluetooth connection, controlling the first operating system to establish the first Bluetooth connection with the second device via the first Bluetooth interface of the Bluetooth module.

3. The method according to claim 1, further comprising:

in a case that the state of the second operating system is a running state or a sleeping state, in response to a second Bluetooth connection instruction, controlling the second operating system to establish the second Bluetooth connection with the second device via the Bluetooth module;

wherein, the second Bluetooth connection instruction is an instruction that is sent by the second device when the second device determines, based on the state of the second operating system, to establish the second Bluetooth connection with the second operating system.

4. The method according to claim 3, wherein controlling, in response to a second Bluetooth connection instruction, the second operating system to establish the second Bluetooth connection with the second device via the Bluetooth module, comprises:

in a case that the first operating system receives the second Bluetooth connection instruction sent by the second device via a second Bluetooth interface, in response to the second Bluetooth connection instruction, controlling the second operating system to establish the second Bluetooth connection with the second device via the second Bluetooth interface of the Bluetooth module connected with the first operating system.

5. The method according to claim 3, further comprising:

in a case that the state of the second operating system switches from the running state or the sleeping state to a shutdown state, controlling the second operating system to disconnect, via the Bluetooth module, the second Bluetooth connection established with the second device.

6. The method according to claim 5, further comprising:

in a case that the state of the second operating system is detected as switching from the shutdown state to the running state or the sleeping state, in response to the second Bluetooth connection instruction, controlling the second operating system to re-establish the second Bluetooth connection with the second device via the Bluetooth module.

7. The method according to claim 1, further comprising:

controlling the first operating system to send data of the first operating system to the second device via the first Bluetooth connection; or controlling the first operating system to send data of the first operating system to the second device via the first Bluetooth connection, and controlling the second operating system to send data of the second operating system to the second device via the second Bluetooth connection.

8. The method according to claim 1, wherein sending the state of the second operating system to the second device via the first Bluetooth connection, comprises:

controlling the first operating system to obtain the state of the second operating system;

sending the state of the second operating system to the second device via the first Bluetooth connection.

9. The method according to claim 8, further comprising:

controlling the first operating system to obtain an operating mode of the first device; wherein, the second operating system is in a shutdown state when the first device is in a first operating mode; and/or, the second operating system is in a running state or a sleeping state when the first device is in a second operating mode; and/or, the second operating system is in the running state when the first device is in a third operating mode; and in a case that the operating mode is the second operating mode or the third operating mode, controlling the first operating system to obtain the state of the second operating system and sending the state of the second operating system to the second device via the first Bluetooth connection.

10. The method according to claim 1, wherein the first process is a micro-control unit, and the second process is a system-on-chip, an operating power consumption of the first processor is less than that of the second processor.

11. A Bluetooth connection method, performed by a second device, wherein a first device comprises a first processor, a second processor, and a Bluetooth module; the first processor is communicatively connected to the second processor, and the Bluetooth module is communicatively connected to the first processor; the first processor is configured to run a first operating system, and the second processor is configured to run a second operating system; the method comprises:

in response to a first Bluetooth connection instruction, establishing a first Bluetooth connection with the first operating system via the Bluetooth module;

receiving, via the first Bluetooth connection, a state of the second operating system sent by the first device;

determining based on the state of the second operating system, whether to establish a second Bluetooth connection with the second operating system.

12. The method according to claim 11, wherein establishing, in response to the first Bluetooth connection instruction, the first Bluetooth connection with the first operating system via the Bluetooth module, comprises:

in response to the first Bluetooth connection, sending the first Bluetooth connection instruction to the first Bluetooth interface of the Bluetooth module;

establishing the first Bluetooth connection with the first operating system via the first Bluetooth interface of the Bluetooth module.

13. The method according to claim 11, wherein determining, based on the state of the second operating system, whether to establish the second Bluetooth connection with the second operating system, comprises:

in a case that the state of the second operating system is a running state or a sleeping state, establishing, via a second Bluetooth interface of the Bluetooth module, the second Bluetooth connection with the second operating system.

14. The method according to claim 11, further comprising:

in a case that the state of the second operating system is a shutdown state, determining not to establish the second Bluetooth connection with the second operating system.

15. An electronic device, comprising a memory, a first processor, a second processor, a Bluetooth module; wherein, the first processor is communicatively connected to the second processor: the Bluetooth module is communicatively connected to the first processor; the first processor is configured to run a first operating system, the second processor is configured to run a second operating system; the memory stores a computer program; the computer program, when being executed, enables the first processor and the second processor to perform operations of:

in response to a first Bluetooth connection instruction, controlling the first operating system to establish a first Bluetooth connection with a second device via the Bluetooth module;

sending a state of the second operating system to the second device via the first Bluetooth connection, enabling the second device to determine, based on the state of the second operating system, whether to establish a second Bluetooth connection with the second operating system.

16. The electronic device according to claim 15, wherein, when controlling the first operating system to establish the first Bluetooth connection with the second device via the Bluetooth module, the computer program further enables the first processor and the second processor to perform operations of:

controlling the first operating system to monitor a first Bluetooth interface of the Bluetooth module;

in a case that a first Bluetooth connection instruction sent by the second device is monitored by the first Bluetooth interface, in response to the first Bluetooth connection, controlling the first operating system to establish the first Bluetooth connection with the second device via the first Bluetooth interface of the Bluetooth module.

17. The electronic device according to claim 15, wherein, the computer program further enables the first processor and the second processor to perform operations of:

in a case that the state of the second operating system is a running state or a sleeping state, in response to a second Bluetooth connection instruction, controlling the second operating system to establish the second Bluetooth connection with the second device via the Bluetooth module;

wherein, the second Bluetooth connection instruction is an instruction that is sent by the second device when the second device determines, based on the state of the second operating system, to establish the second Bluetooth connection with the second operating system.

18. The electronic device according to claim 15, wherein, when controlling the second operating system to establish the second Bluetooth connection with the second device via the Bluetooth module, the computer program further enables the first processor and the second processor to perform operations of: in a case that the first operating system receives the second Bluetooth connection instruction sent by the second device via a second Bluetooth interface, in response to the second Bluetooth connection instruction, controlling the second operating system to establish the second Bluetooth connection with the second device via the second Bluetooth interface of the Bluetooth module connected with the first operating system.

19. The method according to claim 1, wherein after the Bluetooth module in the first device is switched on, the first device controls the first operating system to monitor both a first Bluetooth interface and a second Bluetooth interface of the Bluetooth module.

20. The method according to claim 3, wherein controlling, in response to a second Bluetooth connection instruction, the second operating system to establish the second Bluetooth connection with the second device via the Bluetooth module, comprises:

in response to the second Bluetooth connection instruction, the first device controls the second operating system to establish connection with the first operating system via a universal asynchronous receiver/transmitter (UART) bus, and the first operating system establishes connection with the Bluetooth module via the UART bus.

* * * * *